United States Patent [19]  [11] 4,319,287
Swenson  [45] Mar. 9, 1982

[54] MFM ADDRESS MARK ENCODING
[75] Inventor: Robert L. Swenson, Newark, Calif.
[73] Assignee: Xerox Corporation, Stamford, Conn.
[21] Appl. No.: 909,135
[22] Filed: May 24, 1978
[51] Int. Cl.³ .............................................. G11B 5/09
[52] U.S. Cl. ....................................... 360/40; 360/43
[58] Field of Search ............................. 360/40, 43, 49
[56] References Cited
U.S. PATENT DOCUMENTS
3,387,293 6/1968 Stockebrand .......................... 360/49
3,633,190 1/1972 Morsing et al. ....................... 360/40

Primary Examiner—Vincent P. Canney
Attorney, Agent, or Firm—Leonard Zalman

[57] ABSTRACT

An address mark code for use with Modified Frequency Modulation encoding wherein (1) the first bit of the 8 bit address mark byte is always zero, (2) the address mark byte eliminates a clock pulse between the second and third zero of a string of at least four zeros, (3) the address mark byte contains the binary pattern 101, and (4) the spacing between data pulses and/or clock pulses of the address mark byte is between 1T and 2T where T is the width of a data cell of the address mark.

1 Claim, 3 Drawing Figures

MFM ADDRESS MARK ENCODING

BACKGROUND OF THE INVENTION

During the past several years flexible (floppy) disc files have become widely used. Discette drives provide solutions to data storage applications requiring greater performance reliability than cassettes or cartridge drives and lower costs than removable hard disc files can provide. In order to increase the storage capacity of flexible disc files coding schemes or techniques have been developed to increase the linear recording density of flexible disc drives.

One such scheme devised several years ago is commonly called Modified Frequency Modulation or MFM. This encoding scheme has been used successfully on high performance drives such as the IBM 3330 and the IBM 3340 and is described in publications such as "Simple Encoding Schemes Double Capacity of a Flexible Disc", David J. Kalstrom, Computer Design, September 1976, and "A Method of High Density Recording on Flexible Magnetic Discs," Franchini et al., Computer Design, October 1976. The rules for MFM encoding are:
1. Write data bits are recorded at the center of the bit cell.
2. Write clock bits are recorded at the leading edge of a bit cell if:
   (a) No data bit has been written in the previous bit cell, and
   (b) No data bit will be written in the present bit cell.

In the soft-sector method of disc formatting all disc files, whether of the flexible type or the hard type, include address marks within the data and clock stream of the disc. Address marks accurately locate the beginning of a data field or header of a disc track. The address marks for MFM encoding must meet the following criteria:
1. The address mark must not be generated by normal data encoding.
2. The time between successive magnetic transitions must be in the range of 1T to 2T where T is the width of a data cell.
3. If the data clock separator starts out of phase, this is, if it reads one as zeros and zeros as ones, no pattern on the disc can be accepted as an address mark.

OBJECTS OF THE INVENTION

It is an object of the invention to provide an address mark code for a disc drive.

It is a further object of the invention to provide an address mark code for a disc drive utilizing MFM encoding.

It is another object of the invention to provide for a disc drive utilizing MFM encoding an address mark code meeting the criteria previously set forth.

SUMMARY DESCRIPTION OF THE INVENTION

An address mark code for use with Modified Frequency Modulation encoding wherein (1) the first bit of the address mark byte is always zero, (2) the address mark byte eliminates a clock pulse between the second and third zeros of a string of at least four zeros, (3) the address mark byte contains the binary pattern 101 and (4) the spacing between data pulses and/or clock pulses of the address mark byte is between 1T and 2T where T is the width of a data cell of the address mark. Utilizing the foregoing criteria the address mark cannot be generated by normal Modified Frequency Modulation encoding and the address mark cannot be encoded as an acceptable data pattern even if the data clock separator starts out of phase.

DETAILED DESCRIPTION OF THE INVENTION

Figure 1:
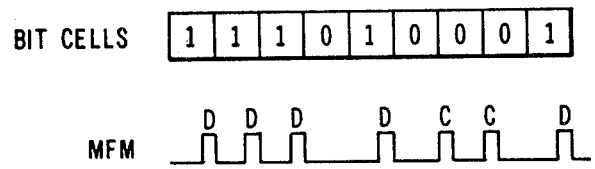
FIG. 1 illustrates an MFM encoding scheme for a byte of data.

Referring first to FIG. 1, there is shown a succession of binary data bit cells and the MFM encoding corresponding thereto. The MFM encoding provides a data bit pulse D in the center of each binary one bit, and a clock pulse C at the leading edge of each bit cell if:
1. No data was written in the previous bit cell, and
2. No data will be written in the present bit cell.

It will be seen that MFM encoding is more efficient (provides higher information density) than FM encoding because it does not provide a clock pulse at the beginning of every bit cell; therefore bit cell time can be made a half of that of Frequency Modulation (FM) encoding for the same flux transition rate.

Referring again to the criteria for an address mark for MFM encoding, the address mark must not be generational by normal data encoding, the time between successive magnetic transitions must be between T and 2T where T is the width of a data cell, and no pattern on the disc can be acceptable as an address mark if the data clock separator starts out of phase.

In accordance with the invention, a novel address mark code which meets the supra criteria provided when the following coding rules are followed:
1. The address mark byte is preceeded by a prefix encoding, at least one byte long and conventionally several bytes long, of all binary ones. Such a prefix is standard in address mark encoding.
2. The address mark byte has an encoding as follows:
   a. The first bit of the byte must be zero such that the start of the address byte is indicated after the byte or bytes of all binary ones.
   b. The address mark byte must contain the binary pattern OO missing clock pulse OO where the clock transition that would normally be encoded between the 2nd and 3rd zeros is omitted.
   c. The byte must contain the binary pattern 101.
   d. The byte must statisfy the 1T-2T rule.

Some address mark bytes that satisfy the supra coding rule are:
00X001010
00X001011
00X000101
00X001101
010100X00
where X indicates an MFM clock pulse that is not encoded for the address mark byte. As can be readily seen all of the exemplary address mark bytes start with a binary 0 and hence satisfy rule 2a. In satisfaction of rule 2b, all of the exemplary address mark bytes omit encoding the clock transition that would normally occur between the second and third zeros of a string of four zeros. The logic of the data encoder (to be described hereafter) is programmed to omit the "missing" clock pulse when the input to the encoder has been identified as an address mark. Rule 2c is met by each of the exemplary address mark bytes since each contains the binary pattern 101 which is provided because the data decoder would otherwise not know if a field of all zeros or all ones was being read. With the 101 binary pattern in the address mark byte, even if the data decoder is out of phase the address mark byte still appears as an illegal data word, that is, as a data word which would not be encoded by the MFM encoding scheme. The exemplary address mark bytes also satisfy rule 2d since successive data bits or successive clock bits or adjacent data and clock bits are never less than one data cell apart (1T) or more than two data cells apart (2T). That is, the MFM encoded data bits for the 101 part of the address mark code are 2T apart and the clock pulses for the 0000 part of the address mark are 2T apart where the clock pulse is omitted between the 2nd and 3rd zeros and no less than 1T apart at all other locations because of the MFM encoding criteria which does not encode clock pulses in a data cell if a data bit is encoded in that data cell.

Figure 2:
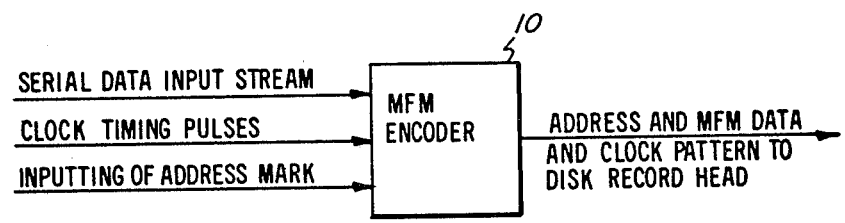
FIG. 2 is a block diagram of a system utilized for writing data, clock and address marks for an MFM encoding scheme.
Figure 3:
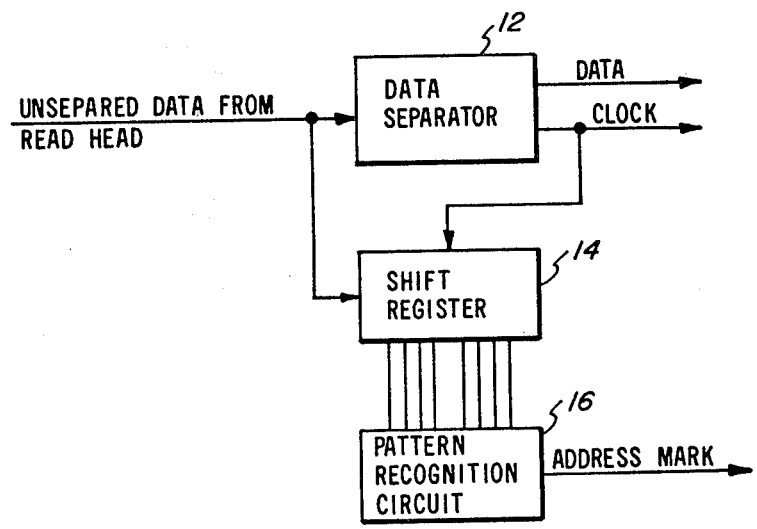
FIG. 3 is a block diagram of a system utilized for decoding data, clock and address marks from an MFM encoding scheme.

Referring now to FIGS. 2 and 3 there are shown in block diagram form exemplary circuits for writing MFM data, clock and address marks on a disc and reading such marks from a disc. It is emphasized that the circuits of FIGS. 2 and 3 are only exemplary and that other circuits for writing and reading will be readily apparent to those skilled in the art. Referring first to the write circuit of FIG. 2. an MFM encoder 10 receives at one input a series data input stream consisting of a binary bit pattern for the novel address mark of the invention followed by the binary data to be recorded. MFM encoder 10 also receives at another input clock timing pulses at a frequency corresponding to the width of each bit cell, such pulses being provided by a conventional oscillator. A third input to MFM encoder 10 identifies when the serial data stream is inputting address mark data.

Encoder 10 includes conventional logic circuitry, such as described in the supra Franchini et al. article, which follows the MFM rules for encoding the serial data stream into an MFM format output stream. Encoder 10 also includes logic responsive to the third input to encoder 10, that is, responsive to the signal indicating that the byte of the serial data input stream presently being received by encoder 10 does not encode the clock pulse between the second and third consecutive zeros of the address mark as the address mark is being received. Thus, the output of encoder 10 contains a byte having the novel address mark code followed by a byte or bytes of data code including clock pulses, with that output being supplied to a disc drive recording head.

Referring now to the disc reading circuit of FIG. 3, the unseparated data from the read head of a disc drive is supplied to a data separator circuit 12 of conventional design, such as described in the supra Franchini et al. article, which provides on separate outputs a data signal and a clock signal. Circuit 12 includes conventional means for generating all clock pulses omitted due to (1) the MFM encoding scheme and (2) the address mark scheme of the invention.

The unseparated data from the read head also is supplied to an 8 bit shift register 14 of conventional design which is clocked by the clock pulses generated by the data separator circuit 12. The stages of the shift register 14 are coupled in parallel to a pattern recognition circuit 16 of conventional construction which produces an output signal when the input thereto from register 14 corresponds to the clock and bit mark code of the address mark selected in accordance with the criteria set forth previously.

What is claimed is:

1. A data encoding system including storage member for storing in the form of magnetic transitions data information, clock information and address mark information, and first means for recording on said storage member said data information and said clock information in a Modified Frequency Modulation encoding scheme which encoding scheme (a) records at the center of a bit cell a data pulse representative of a binary one and (b) records at the leading edge of a bit cell a representation of a clock pulse if no data was written in either the present bit cell or the previous bit cell, characterized in that said first means includes address mark encoding means for recording on said storage member representations of at least one address mark byte, wherein said at least one address mark byte is characterized by commencement with a binary zero bit, inclusion of the binary pattern 101, and inclusion of a series of binary zero bits, and said address mark encoding means omits recording a clock pulse that conventionally would be recorded in Modified Frequency Modulation encoding due to the presence in said address mark byte of said series of binary zeros.

* * * * *